United States Patent [19]
Nagayama et al.

[11] Patent Number: 5,837,333
[45] Date of Patent: Nov. 17, 1998

[54] CHROMOGENIC FILM HAVING A DIFFRACTION PATTERN SIMILAR TO AN OPAL

[75] Inventors: Kuniaki Nagayama, Tokyo; Antony S. Dimitrov, Tsukuba, both of Japan

[73] Assignee: Research Development Corporation of Japan, Japan

[21] Appl. No.: 608,542

[22] Filed: Feb. 28, 1996

[30] Foreign Application Priority Data

Feb. 28, 1995 [JP] Japan .................................. 7-041038

[51] Int. Cl.⁶ ........................................................ B44F 9/04
[52] U.S. Cl. ................................ 428/15; 359/558; 428/29
[58] Field of Search ................................. 428/15, 29, 44; 427/430.1; 359/558

[56] References Cited

U.S. PATENT DOCUMENTS

| | | | |
|---|---|---|---|
| 3,873,339 | 3/1975 | Hudson | 428/428 X |
| 4,675,071 | 6/1987 | Matsumoto et al. | 264/40.1 X |
| 4,693,800 | 9/1987 | Edwards et al. | 428/543 X |
| 4,809,417 | 3/1989 | Normann, Jr. | 428/15 X |
| 5,234,718 | 8/1993 | Mino et al. | 427/430.1 X |
| 5,270,080 | 12/1993 | Mino et al. | 427/430.1 |
| 5,364,672 | 11/1994 | Schultze-Kraft | 428/15 |
| 5,437,892 | 8/1995 | Nagayama et al. | 427/372.2 |
| 5,505,996 | 4/1996 | Nagayama | 428/44 X |
| 5,540,951 | 7/1996 | Nagayama et al. | 427/372.2 |
| 5,599,594 | 2/1997 | Pauley | 428/15 X |

OTHER PUBLICATIONS

Nagayama et al., *Langmuir* 1993, vol. 9, pp. 3695–3701, "Colored Multilayers from Transparent Submicrometer Spheres".

Ivars Peterson, *Science News,* Nov. 4, 1995, vol. 148, No. 19, pp. 296 & 297, "Butterfly Blue".

*Primary Examiner*—Henry F. Epstein
*Attorney, Agent, or Firm*—Wenderoth, Lind & Ponack, L.L.P.

[57] ABSTRACT

The present invention provides a high-luminance opal-like diffraction chromogenic film having no dead angle, which comprises a hexagonally close-packed grating monolayer film of micron-order particulates.

4 Claims, 11 Drawing Sheets
(8 of 11 Drawing(s) Filed in Color)

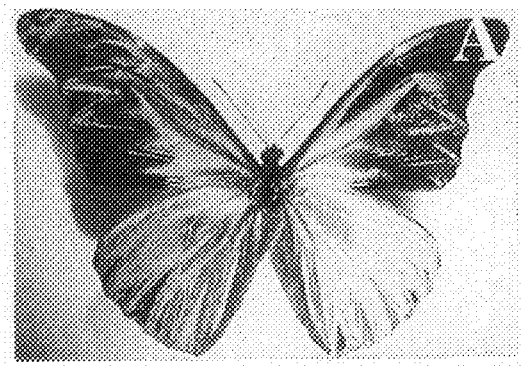
FIG. IA
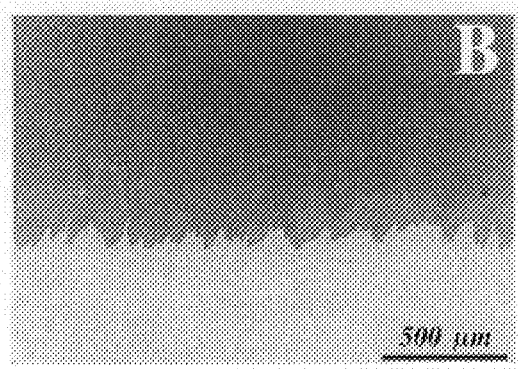
FIG. IB
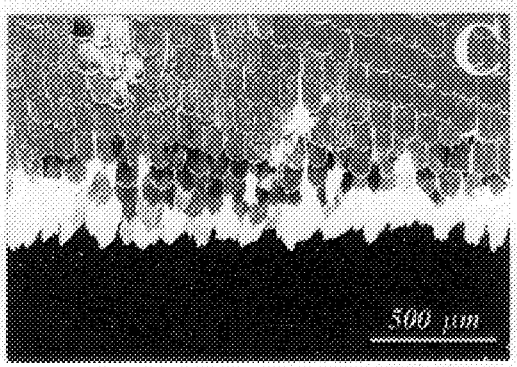
FIG. IC
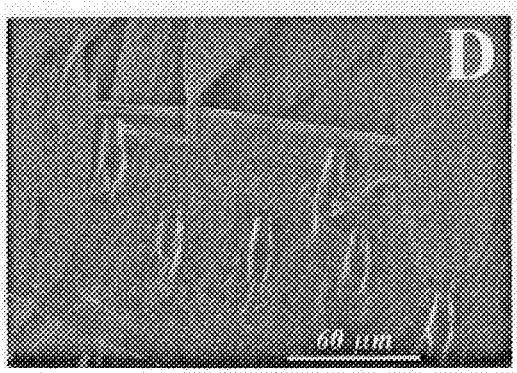
FIG. ID

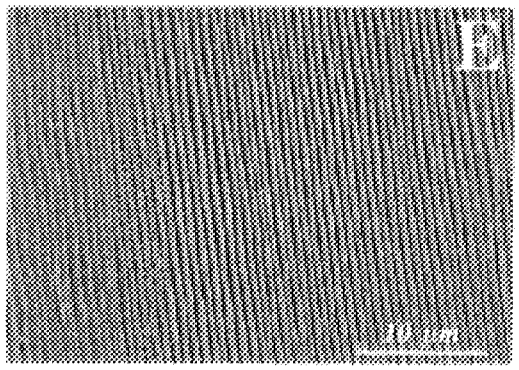
FIG. IE
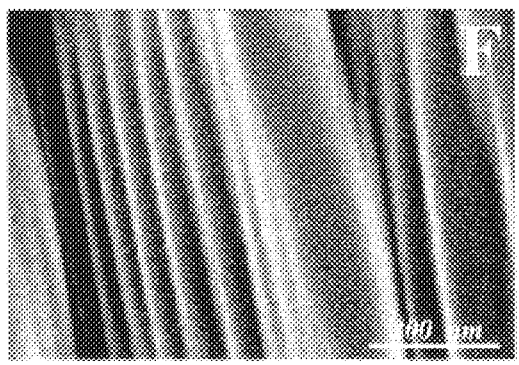
FIG. IF
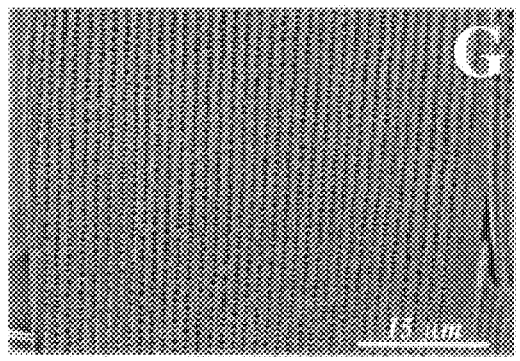
FIG. IG
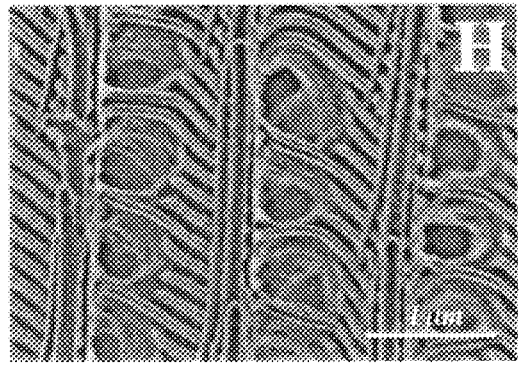
FIG. IH 0.5 mm 1 cm 1 cm 1 cm 0.5mm ically. There is a clear diffraction, the color of which changes with the view angle even with the same Morpho wing; FIG. 5C is a photograph taken in a dark-field mode by irradiating a green light; FIG. 6A is a photograph taken in a place of a drawing, showing a diffraction color of sunlight of a polystyrene (0.953 μm) monoparticulate film deposited on a side of a crystal ball;

CHROMOGENIC FILM HAVING A DIFFRACTION PATTERN SIMILAR TO AN OPAL

The file of this patent contains at least one drawing executed in color. Copies of this patent with color drawing (s) will be provided by the Patent and Trademark Office upon request and payment of the necessary fee.

FIELD OF THE INVENTION

The present invention relates to an opal-like diffraction chromogenic film. More particularly, the present invention relates to a novel diffraction chromogenic film which is useful as a material for esthetics and decoration purposes in the form of an opal-like diffraction chromogenic film with few dead angles, and a method for manufacturing same.

PRIOR ART

Various diffraction color developing methods using diffraction phenomenon have conventionally been known in decoration and esthetics areas.

These conventional methods include, for example:

(1) Diffraction color development utilizing a diffraction grating from mechanical linear streaks (holography, for example);

(2) Diffraction color development based on linear and spot diffraction gratings from development of a photograph;

(3) Diffraction color development through preparation of a high-accuracy diffraction grating by the LSI pattern preparation technology;

(4) Weak diffraction color development based on preparation of convex-concave irregularities of a solid surface; and (5) Preparation of irregular gratings through application of an enameling agent containing pigment particles, and weak color development occurring along with such application.

However, all these conventional methods had the following problems:

(1) The diffraction light from mechanical linear streaks, while showing a high luminance, exhibits a strong diffraction phenomenon only in a direction at right angles to the line running direction, and contains dead angles.

(2) Linear streaks and spot gratings based on photographic development permit preparation of high-accuracy diffraction gratings for a size larger than 1 μm, whereas it is difficult to achieve a high luminance since the gratings are developed in a film. Because of the size limitation of photosensitive particles, furthermore, variations of lines and spots in size intrinsic to development occur at a diffraction grating period of under 1 μm, resulting in a dim diffraction light.

(3) LSI pattern technology, while permitting preparation of linear or spot diffraction gratings with a high resolution (0.3 μm), is very expensive.

(4) Irregular gratings (spots) obtained by granulating with sand paper or by etching give only a very weak diffraction light and lead to diffuse reflection.

(5) When a solvent (enameling agent) containing pigment particulates is applied, these particulates produce irregular gratings and the resulting diffuse reflection leads to a very weak diffraction light.

SUMMARY OF THE INVENTION

The present invention has therefore an object to solve the defects in the conventional diffraction color development as described above, and to provide a high-luminance gratings which comprise a film composed of particulates and have few dead angles.

As means to solve the above-mentioned problems, the present invention provides an opal-like diffraction chromogenic film which comprises a hexagonally close-packed grating monolayer film of micron-order particulates.

BRIEF DESCRIPTION OF THE DRAWINGS

FIGS. 1A–1H show the following:

FIG. 1A is a photograph, taken in a place of a drawing, showing a whole view of a Morpho butterfly; FIG. 1B is a photomicrograph taken with an angle of incidence showing no diffraction in place of a drawing, showing a wing of a Morpho butterfly; FIG. 1C is a diffraction light photomicrograph thereof; FIG. 1D is a scanning-type electron photomicrograph taken in place of a drawing, showing the adsorption of scales to the wing surface; FIG. 1E is a scanning type electron photomicrograph taken in place of a drawing, showing a diffraction grating of the scale surface at the center of a wing; FIG. 1F is an enlarged photograph thereof; FIG. 1G is a scanning-type electron photomicrograph taken in place a drawing, showing a diffraction grating of scales surrounding a wing; and FIG. 1H is an enlarged photograph thereof;

FIG. 2A is a scanning-type electron photomicrograph taken in place of a drawing, showing scales of a butterfly not developing a color; FIG. 2B is a scanning type electron photomicrograph taken in place of a drawing, showing a surface texture of the corresponding scale; and FIG. 2C is an enlarged photograph thereof;

FIG. 3A is a photomicrograph taken in place of a drawing, showing a whole view of a polystyrene monoparticulate film exhibiting diffraction color development as an embodiment; FIG. 3B is a corresponding photomicrograph taken with an angle of incidence showing no diffraction light; FIG. 3C is a diffraction light photomicrograph taken in place of a drawing, showing a polystyrene monoparticulate film; and FIG. 3D is a scanning-type electron photomicrograph taken in place of a drawing, showing a monocrystalline region in a polystyrene monoparticulate film;

FIG. 4A is a photomicrograph taken in place of a drawing, showing diffraction color development by sunlight of a polystyrene (0.953 μm) monoparticulate film; FIG. 4B is a photomicrograph taken in place of a drawing, showing diffraction color development by sunlight of a polystyrene (1.083 μm) monoparticulate film; and FIG. 4C is a photomicrograph taken in place of a drawing, showing diffraction color development by sunlight of a polystyrene (2.106 μm) monoparticulate film;

FIG. 5A is a bare-eye photograph taken by irradiating a white light; FIG. 5B is a diffraction light photomicrograph taken in a dark-field mode (inlay at right upper portion is a photograph showing no diffraction due to the wrong incidence angle): upper half: scale texture of Morpho butterfly; lower half: the domain structure of a polystyrene monoparticulate film; and FIG. 5C a scanning-type electron photomicrograph: upper half: diffraction grating pattern of a scale surface; lower half: a close-packed pattern of a monoparticulate film;

DETAILED DESCRIPTION OF THE INVENTION

An opal-like high-luminance diffraction grating film with fewer dead angles is achieved by the diffraction chromogenic film of the present invention as described above. More specifically, this unique chromogenic film was derived from a detailed study on the beautiful opal-like diffraction light of well-known Morpho butterfly's wing, and on the basis of findings the study, the present invention was perfected as an independent and reproducible construction.

The principle of light emission of Morpho butterfly's wing is as follows.

Figure 2A:
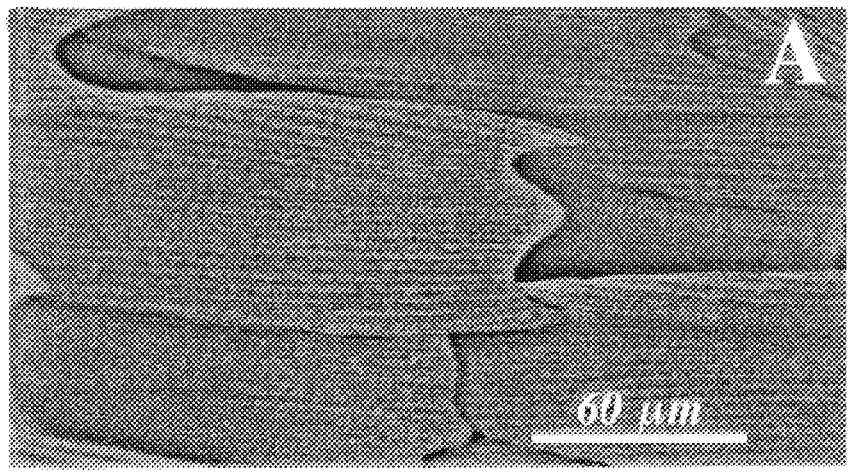
FIGS. 2A–2C show the following.
Figure 2B:
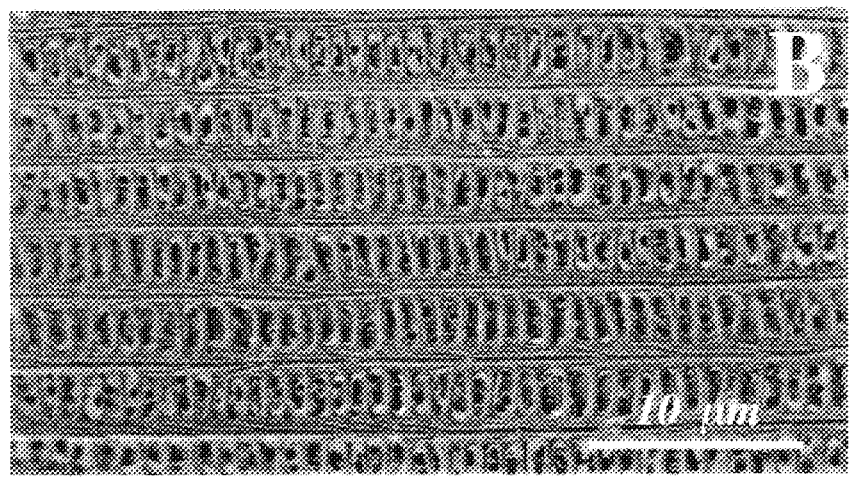
Figure 2C:
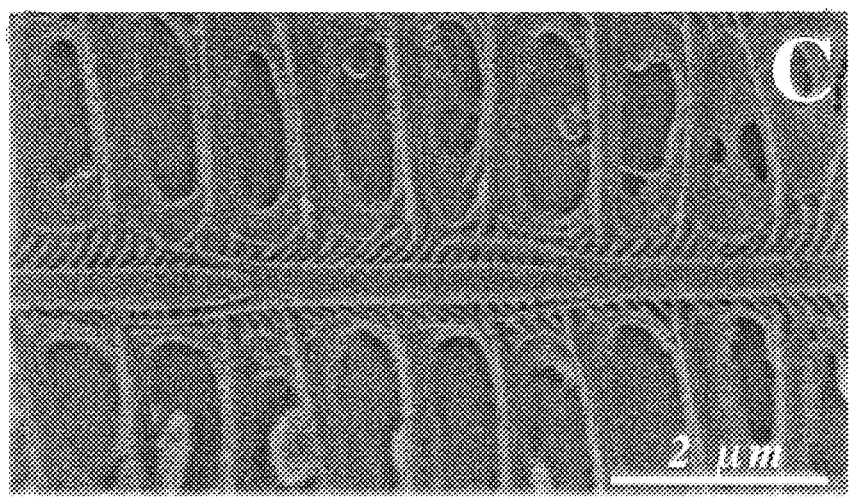

An experiment is carried out to investigate the origination of the color development of the Morpho butterfly. The surface textures of wings of the three kinds of butterfly (of which two are Morpho butterflies) are observed with different microscopies. It is confirmed that Morpho RHETENOR (Morpho (Cypritis) rhetenor rhetenor Cramer) from Guiana develops a color of ultramarine, and regular streaks of 0.65 μm run on the surface of scales of the wing, and that Morpho SULKOWSKI (Morpho (Cytheritis) stoffeli stoffeli Le Moults & Real) from Peru presents a sky blue color development, and regular streaks of 0.8 μm run on the surface of the scales of the wing. On the other hand, the butterfly of the Tokyo suburbs, which does not have diffraction color development shows a scale surface texture having a regularity of several μm. These findings suggest the presence of diffraction gratings of the order of light wavelength is therefore important for the beautiful diffraction color development of the Morpho butterfly. More specifically, FIG. 1 demonstrates that the color development of Morpho rhetenor's (Morpho (Cypritis) rhetenor rhetenor Cramer) wing does not originate in the pigment: FIG. 1A represents a whole view and FIG. 1B shows scales with a titled reflection light of a microscope with an incorrect incidence angle for diffraction. This is the original color of the butterfly's wing. A photomicrograph of the same object as viewed with a darkfield diffraction light is shown in FIG. 1C: a clear color development of ultramarine is mainly observed, provided however that color changes into brown and yellow in the peripheral portions of the wing. To observe textures corresponding to these colors, the individual scale surfaces are observed by a scanning-type electron microscope. These are shown in FIGS. 1D to 1H. FIG. 1D illustrates contact of the scales and the wing sheet. FIGS. 1E and 1F are enlarged photographs of the surface of the ultramarine color development section of a scale: large streaks are observed running at intervals of 0.65 μm. FIGS. 1G and 1H are enlarged photographs of the same scale surfaces of yellow color development. Intervals of diffraction gratings are larger than 1 μm. As shown in FIGS. 1F and 1H, finer texture is observed between gratings. FIG. 2A shows in contrast scales of the butterfly from the Tokyo suburb, and FIGS. 2B and C are enlarged photographs of the surface thereof. Intervals between regular linear gratings are observed to be about 5 μm. These observations reveal that the beautiful color development of Morpho butterflies is a diffraction light caused by the regular texture of the surface of the order of wavelength, having no relationship with the color of the material.

From the findings as described above, the present inventors studied the color development of a monoparticulate film based on particulates of wavelength-order and corresponding texture, and completed an opal-like diffraction chromogenic film free from dead angles having a hexagonally close-packed grating monolayer film of micron-order particulates. The dead angle free arises from the three grating directions intersecting by an angle of 60° C. in the hexagonal particle arrays.

This diffraction chromogenic film is manufactured by a method for forming a monoparticulate film based on advection and accumulation of particulates onto a solid substrate, which have been established by the present inventors. This method comprises the steps of immersing a solid substrate in an aqueous suspension containing particulates such as a polymer or ceramics, and pulling up the substrate under closely controlled conditions, thereby forming a monoparticulate film on the substrate.

Because the low adsorption property relative to a substrate is positively utilized during formation of this monoparticulate film, it is possible to lithograph mechanically and easily to a desired pattern.

For example, particulates can be stripped off by pressing a stamp, in which an adhesive tape from which a desired pattern has been cut off is affixed to a flat glass surface, against the monoparticulate film. Patterning can thus easily be accomplished. It is needless to mention that other more precise methods using irradiation of an electron beam or ions are also applicable.

Fixing of the monoparticulate film is also easy. In response to properties of the particulate used, fixing may be accomplished by irradiation of an energy beam such as an electron beam, ions or a light, by heating, or by increasing the physical adsorption with particulates through hydrophilization or hydrophobization of the substrate surface. For fixing, such means as evaporation of a metal such as gold or silver, or application thereof may also be considered. These means may be used also for intensifying color development of a chromogenic film, in addition to the use thereof for fixing. It is effective, for example, to evaporate silver or gold in the form of a film having a thickness of about 10 nm.

The diffraction chromogenic film of the present invention can be used for various applications, by using any of several combinations of the method for forming a particulate monolayer film, lithography and fixing, as described above.

The diffraction chromogenic film itself is very useful as a material for decoration and esthetics purposes.

Now, the present invention is described in further detail by means of examples.

EXAMPLES

Figure 3A:
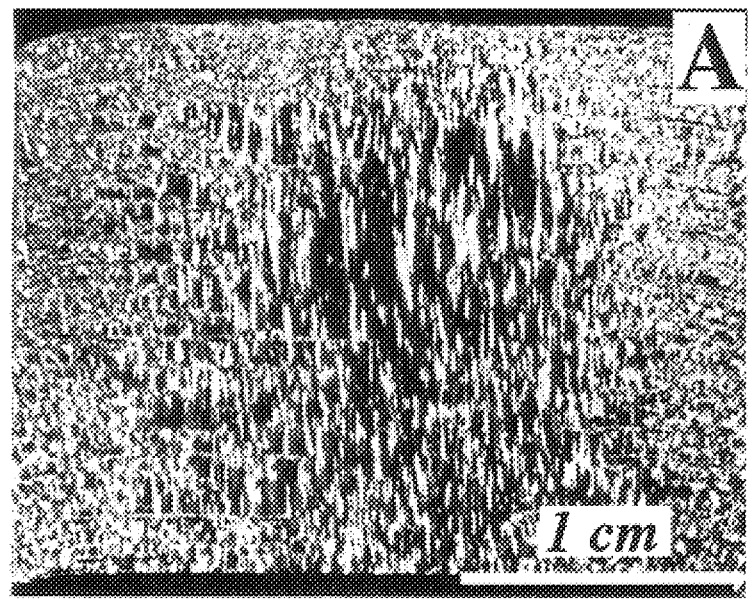
FIGS. 3A–3D show the following.
Figure 3B:
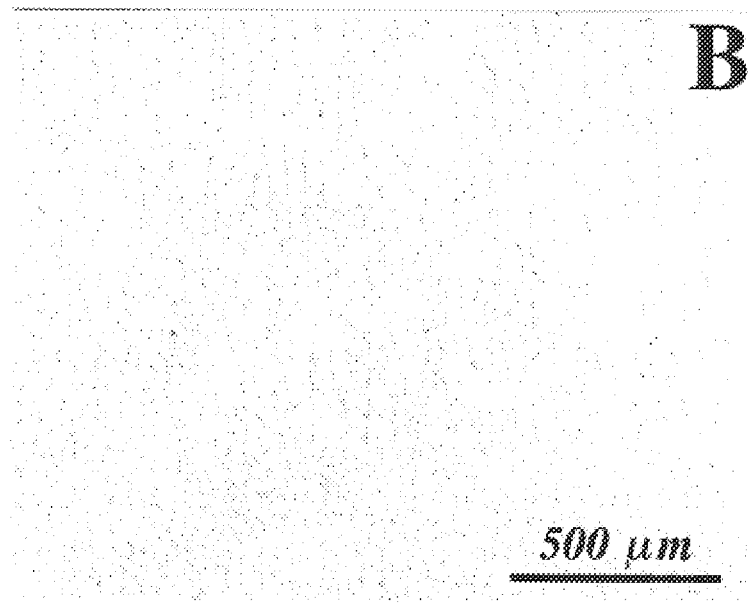
Figure 3C:
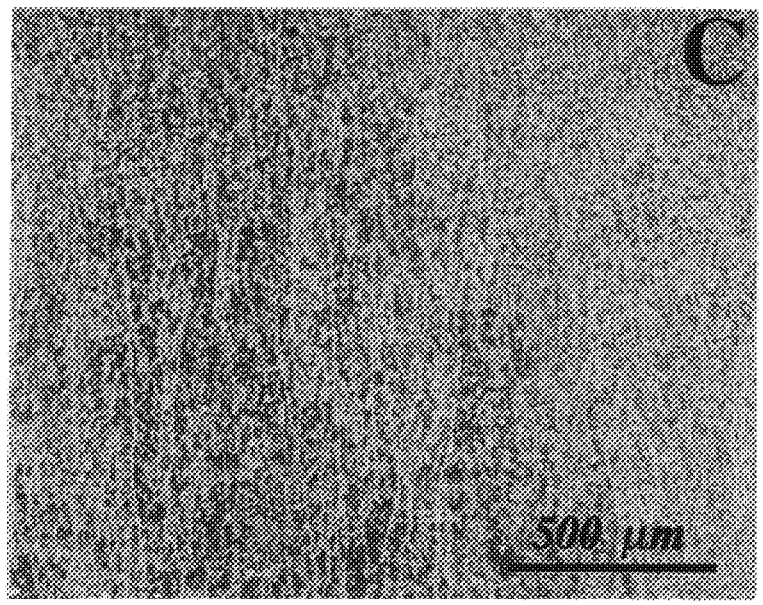
Figure 3D:
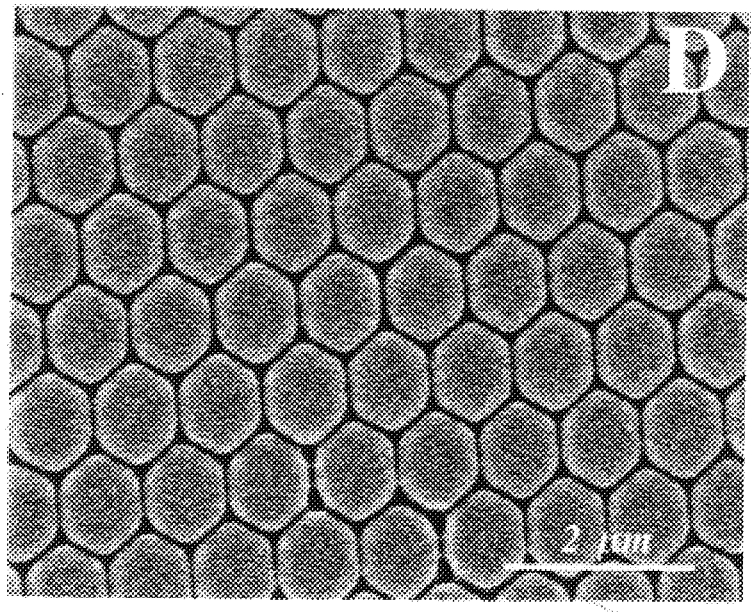
Figure 4A:
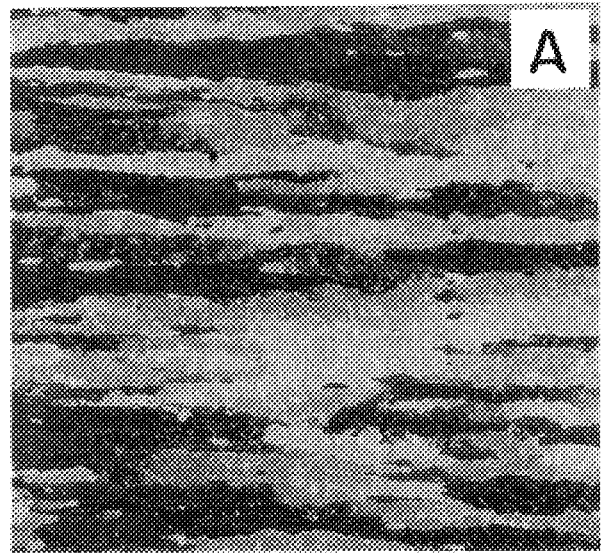
FIGS. 4A–4C show the following.
Figure 4B:
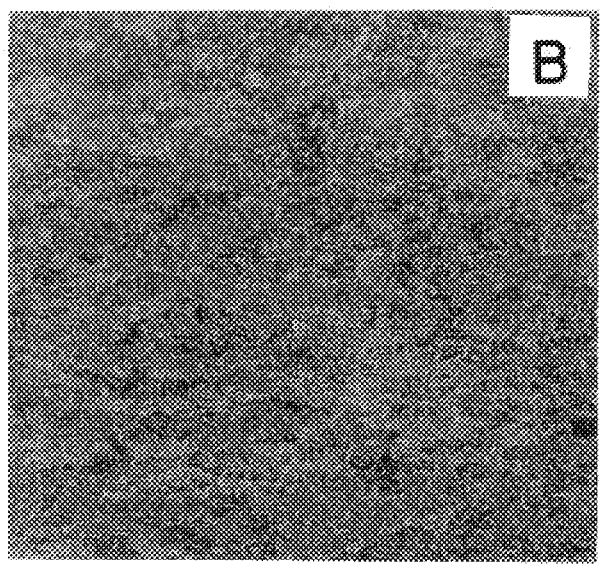
Figure 4C:
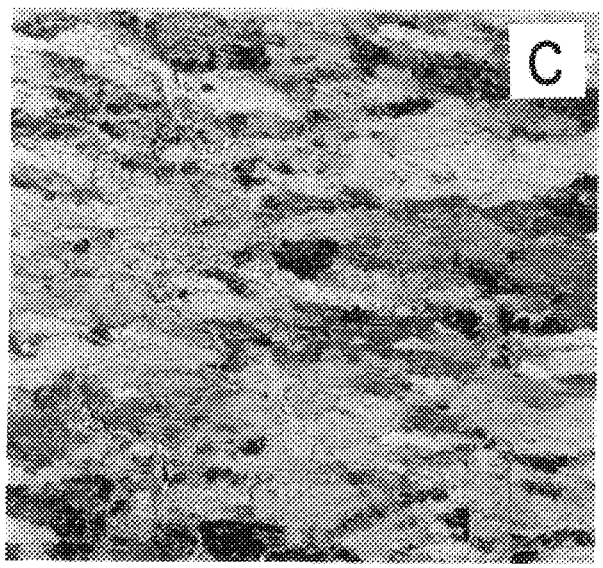

A. Color development of hexagonally close-packed grating monolayer film of micron-order particulates (monoparticulate film):

Color development of the monoparticulate film based on wavelength-order particulates (polystyrene balls) and the corresponding texture are described below. FIG. 3A is a whole view of color development of the monoparticulate film. FIG. 3B is a photomicrograph as observed with an angle of no diffraction: there is no color development because polystyrene balls are colorless. FIG. 3C is a photomicrograph of the same object as viewed with a proper angle showing a CD diffraction in a dark field: clear diffraction color development is observed. The monoparticulate film is not totally monocrystalline, but is of a polycrystalline texture in which crystal orientations are slight different among them, thus resulting in colors dependent upon crystal orientation. In FIG. 3C, many streak defects are observed between monocrystalline regions. An enlarged view obtained through an electron microscope is shown in FIG. 3D. The interior within a monocrystalline region presents such a monolayer hexagonal close-packed grating. Observation of color development dependent upon the size of particulate, as made with the sunlight as the light source, permits confirmation that, when the particulate size is of the same order as the wavelengths of visible light, diffraction color development is dependent upon the particle size and the crystal orientation, as 0.953 μm (FIG. 4A), 1.083 μm (FIG. 4B), and 2.106 μm (FIG. 4C).

Figure 5A:
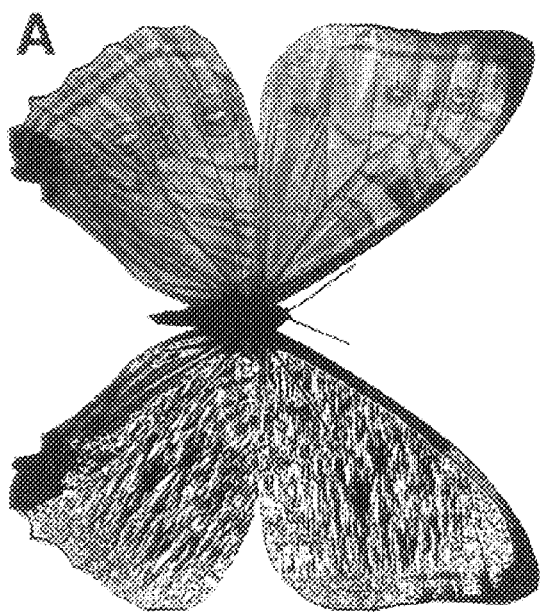
FIGS. 5A–5C show a photograph taken in place of a drawing, comparing color development between a wing of a Morpho SULKOWSKI (Morpho (Cytheritis) stoffeli stoffeli Le Moults & Real) from Peru, i.e., Morpho SULKOWSKI (Morpho (Cytheritis) stoffeli stoffeli Le Moults & Real) originating in Peru (upper half of FIG. 5A, left wing) and a Morpho butterfly wing synthesized with a 0.953 μm polystyrene monoparticulate film (lower half of FIG. 5A, right wing).
Figure 5B:
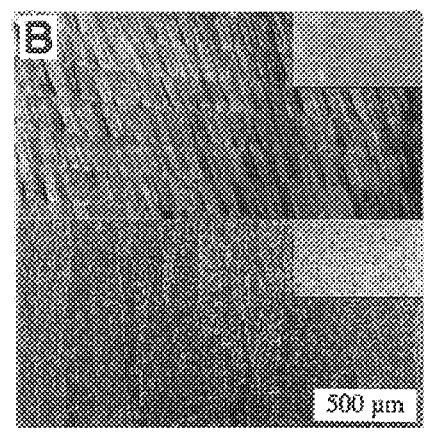
Figure 5C:
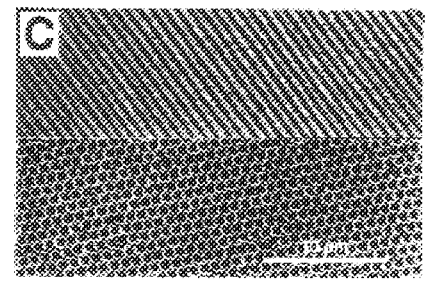

FIGS. 5A–5C compare the color development of the wing of Morpho butterfly and that of a monoparticulate film. The processes of color development with the same incidence of a monoparticulate film of 0.953 μm polystyrene balls and Morpho SULKOWSKI (Morpho (Cytheritis) stoffeli stoffeli Le Moults & Real) are shown with different expansions. FIG. 5A illustrates real images of the Morpho butterfly: the upper image is a natural one, and the lower image is a monoparticulate film comprising a chromogenic film but into the shape of butterfly wing. The artificial wing was prepared by enlarging an actual size one by a computer. Color development shown in FIG. 5A was taken by irradiating a light from above to below at an angle of incidence of 60°. When the incident direction is turned by 90° with the same angle of incidence, color development of Morpho butterfly disappears. On the other hand, color development of the artificial wing comprising the monoparticulate film showed almost no change, i.e., there was no dead angle in the color development by the diffraction light. FIG. 5B is an enlarged view of a wing of a Morpho butterfly and a monoparticulate film as observed through an optical microscope: a crystal region of almost the same order as 100 μm scale of butterfly is observed. FIG. 5C is an enlarged view observed through an electron microscope: the beautiful shine of the Morpho butterfly comes from very regular linear diffraction gratings (FIG. 5C, upper stage). On the other hand, FIG. 5C reveals that the artificial monoparticulate film also forms very regular spot-like diffraction gratings, with a period substantially equal to that of Morpho butterfly.

It is thus suggested that the reflection of light from a surface having a high-regularity texture has a high-luminance diffraction light, and the extent of color development thereof depends upon the grating period. Color development of an artificial monoparticulate film is however different from that of Morpho butterfly in two points. The first point is due to the difference in texture between the two cases in a color development region of the order of 100 μm, as is clear from FIG. 5B. While the scale of the Morpho butterfly has perfectly uniform orientations of texture, the monoparticulate film has slightly varying crystal orientations, thus resulting, not in a single color development, but in a color zone having a range around a specific color. The two cases are similar to each other in that a shining diffraction color development is available. The second point is that color development of the artificial particulate film has no dead angle, surpassing nature.

Figure 6:
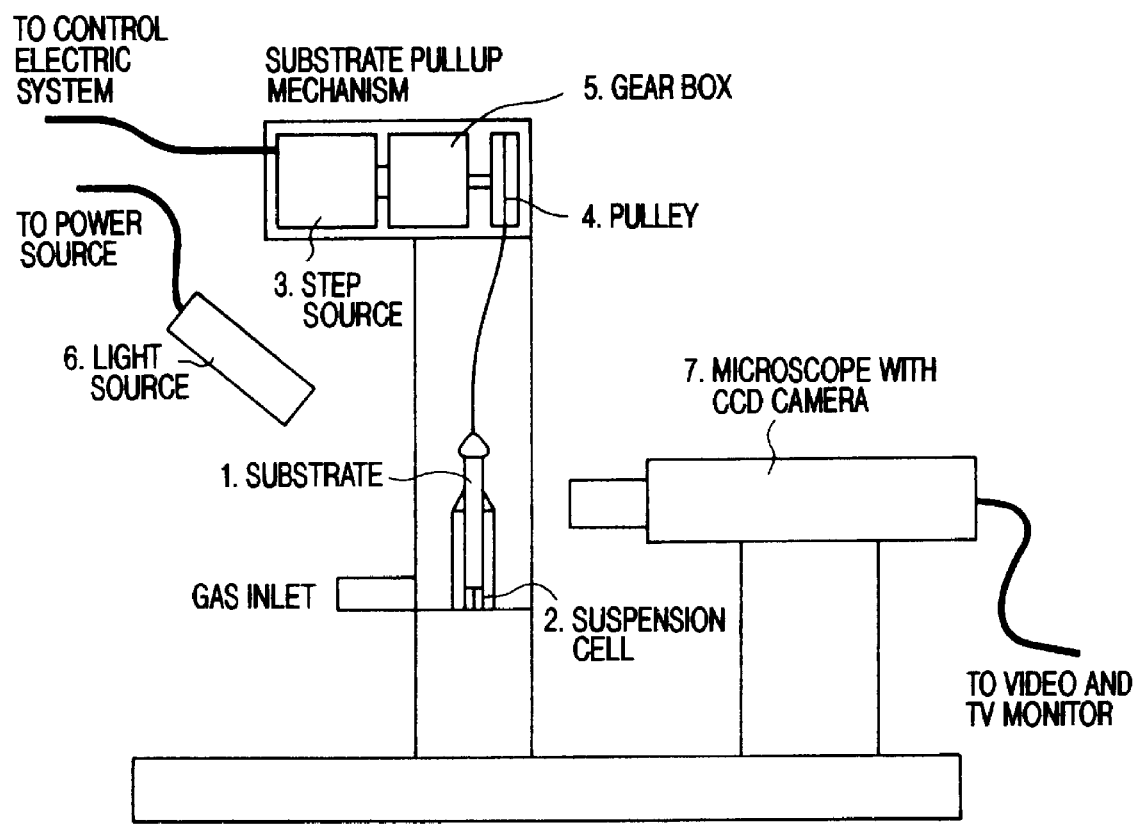
FIG. 6 shows a side view illustrating an embodiment of the apparatus used in the present invention.

B. Preparation of monoparticulate film:

The present inventors have already proposed the principle of preparation. More specifically, this method of preparation is as shown in a schematic drawing of the apparatus for preparation given in FIG. 6. That is, a glass substrate previously subjected to a hydrophilization treatment is immersed in a suspension containing particulates, and pulled up by means of a small pulley rotated by a step motor. The speed is adjusted by altering the gear ratio. Growth of the monoparticulate film is constantly observed through a horizontal type microscope while irradiating a light onto the film growth section. An enlarged image is converted by a CCD camera into a TV image, and the process of growth is monitored in a real time manner. For a typical apparatus, the cell has dimensions of 100×40×10 mm, and the pulley has a diameter of 2 cm. The microscope has a resolution of 0.35 μm, and the pulling speed is variable between 0.1 μm/sec and 10 μm/sec.

A monoparticulate film was actually prepared as follows.
<a> Particulates: polystyrene particulates (properties as shown in Table 1) and 1 μm silica particulates

TABLE 1

| Diameter (nm) | Polydispersity (nm) | Density (g/cm³) | Refractive index |
|---|---|---|---|
| 2106 | ±17 | 1.053 | 1.580 |
| 1096 | ±7 | 1.057 | 1.592 |
| 1083 | ±10 | 1.058 | 1.594 |
| 953 | ±9 | 1.057 | 1.594 |
| 814 | ±23 | 1.065 | 1.565 |
| 506 | ±10 | 1.054 | 1.595 |
| 479 | ±5 | 1.054 | 1.595 |
| 309 | ±4 | 1.054 | 1.595 |
| 144 | ±2 | 1.065 | 1.565 |
| 79 | ±2 | 1.065 | 1.592 |

Figure 7A:
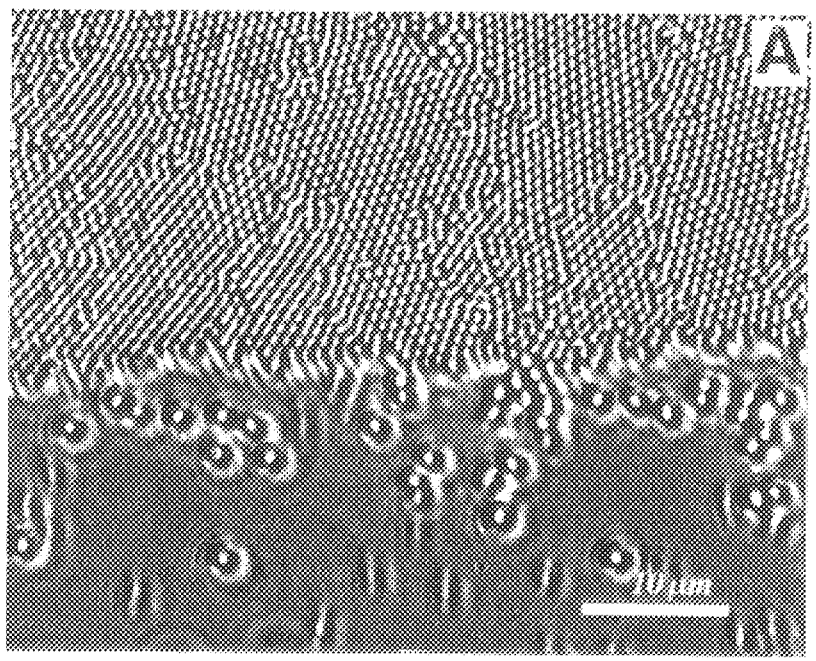
FIG. 7A and FIG. 7B are photomicrographs taken in place of a drawing, showing the process of growth of a polystyrene monoparticulate film.
Figure 7B:
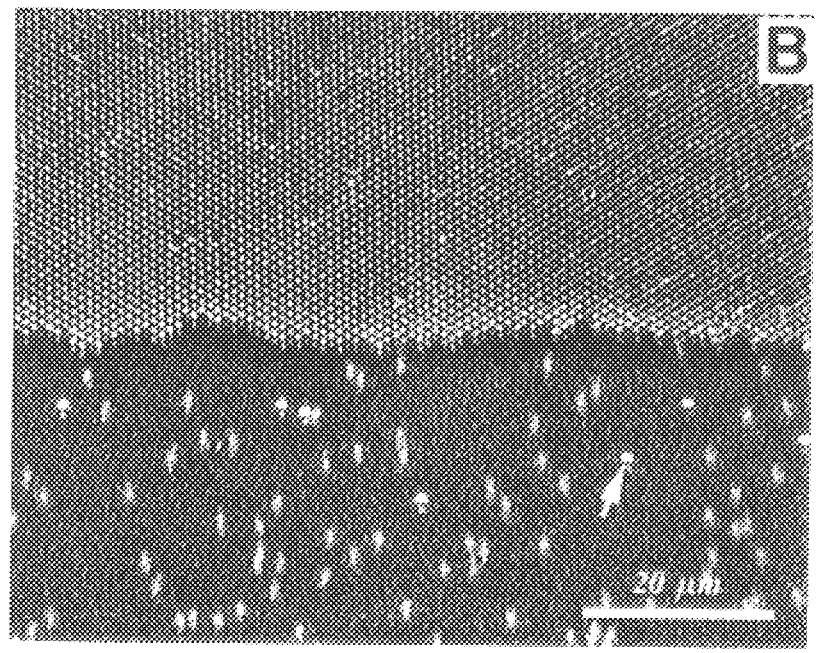
Figure 8A:
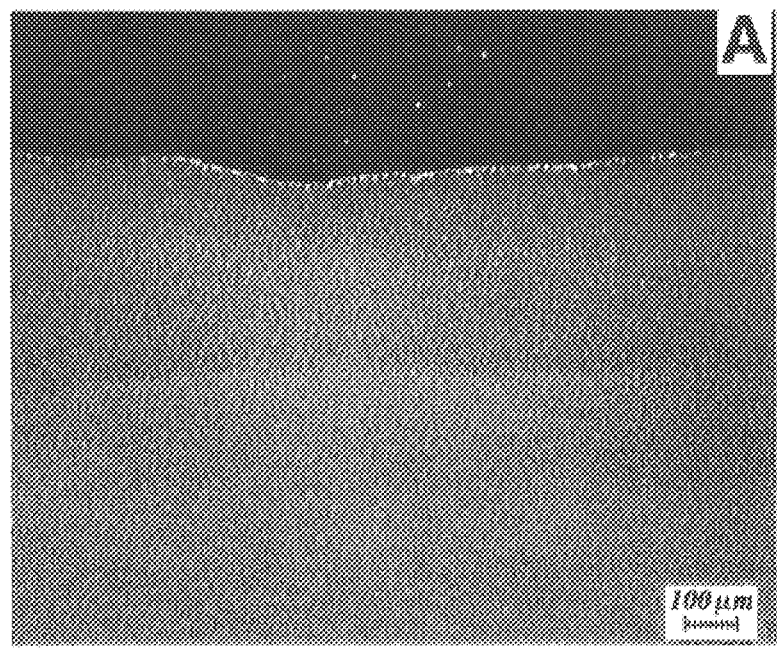
FIG. 8A and FIG. 8B are photomicrographs taken in place of a drawing, showing the process of a growth of a monoparticulate film of silica particulate.
Figure 8B:
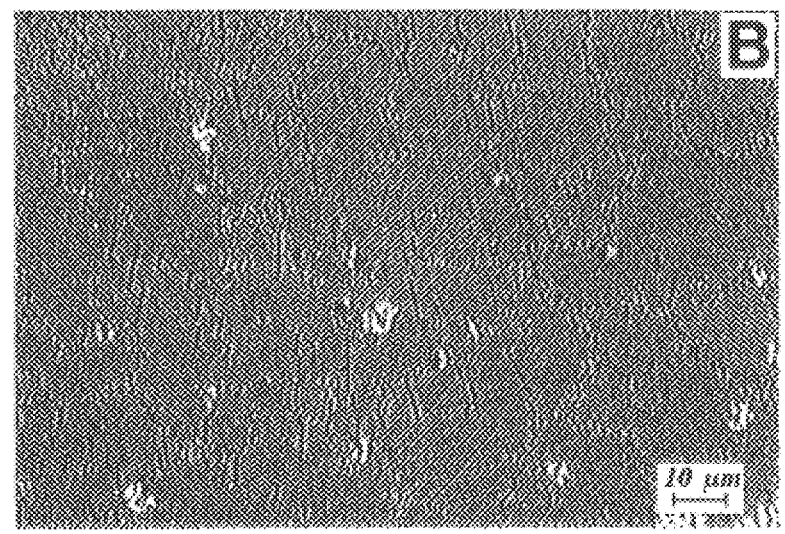

<b> Solvent: For polystyrene balls, pure water, or an aqueous solution containing the following ingredients:
  a) 0.001 mol/l sodium dodecyl sulfate (SDS)
  b) 0.001 mol/l octanol
  c) 0.01 mg/ml ferritin
  For silica balls, 2,2,2-trifluoroethanol
<c> Glass and treatment thereof: Slide glass (76×26×1 mm) was subjected to a hydrophilization treatment in the following procedure: immersing it in a chromic acid solution for a whole day and night, rinsing it with water, then immersing it in 0.1M SDS or ethanol for an hour, rinsing it with water and drying same for the SDS-dipped one, or directly drying the ethanol-dipped one. In order to prepare a uniform monoparticulate film, it suffices to immerse a glass plate in a suspension of particulates and then pull it up slowly. Conditions for film forming in this case are given by the following formula:

$$v_e = \frac{\beta l}{0.605} \cdot \frac{j_e}{d(l-\phi)} \quad [1]$$

where, $V_c$ is the crystal growing rate when forming a uniform monoparticulate film (i.e., the pulling speed of the glass plate); $\beta$ is a hydrodynamic coefficient (about 1); $j_e$ is an evaporation rate of water at crystal section with a length, l; d is a diameter of particulate; and $\phi$ is a volumic ratio of particulates in suspension. The above Formula [1] is in a sense a formula for film formation under ideal conditions. Actually, therefore, the pulling speed is controlled with due regard to various uneven surface conditions such as differences in wettability, presence of dust, and variations of the particle diameter. The process of the growth of the monoparticulate film is constantly monitored with a view to optimizing the pulling speed while watching the process of film growth. An actual example of the growth process of a monoparticulate film in the middle of monitoring is shown in FIG. 7A and FIG. 7B. FIG. 7A suggests that 0.814 $\mu$m polystyrene particulates are forming a monoparticulate film comprising small regions having different orientations. FIG. 7B shows a monocrystal region formed with 0.953 $\mu$m polystyrene particulates: a flow of particles running toward a crystalline film. Because of a high particle speed of 100 $\mu$m/s, the particles in travel look obscure. Bright particles indicated by an arrow are admixed particles having a sufficiently large diameter of at least 0.953 $\mu$m, which are at a standstill, since they are strongly pressed against the plate by a surface wetted with water. When using 1 $\mu$m silica particulates, particles cannot be kept dispersed in a water suspension for a long period of time, because silica has a specific gravity of 1.4 to 1.44, before start of precipitation. It is therefore impossible to form a satisfactory film through advection and accumulation of particles. By using trifluoroethanol as a solvent having a specific gravity larger than water, the large specific gravity permits satisfactory suspension of silica particles. FIG. 8A and FIG. 8B are enlarged photographs showing the process of growth of a silica monoparticulate film and formation of gratings. In the photomicrograph taken through a dark-field microscope shown in FIG. 8A, the black portion is a bare glass surface; the green portion is a silica monoparticulate film; and the yellow portion is a film wetted with silica suspension. These monitor photographs suggest that the principle of formation of a monoparticulate film is based on advection and accumulation of particles due to evaporation of trifluoroethanol and packing brought about by interparticle (lateral capillary) force in a liquid thin film, as in the case of polystyrene particulates as described above. The hexagonal close-packed film shown in the enlarged photograph of FIG. 8B suggests that the interparticle packing force exerts a strong effect.

Figure 9A:
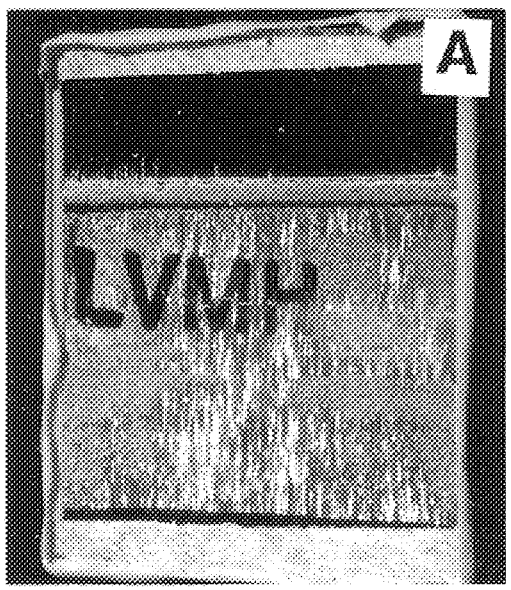
FIG. 9A, FIG. 9B, FIG. 9C and FIG. 9D are photomicrographs taken in place of a drawing, showing the results of the lithography of a monoparticulate film.
Figure 9B:
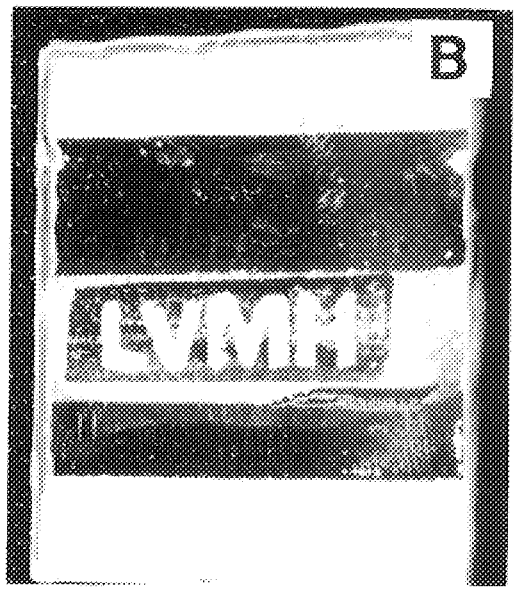
Figure 9C:
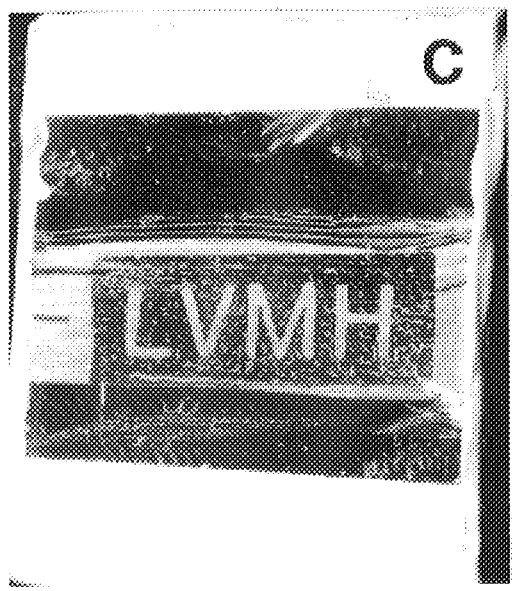
Figure 9D:
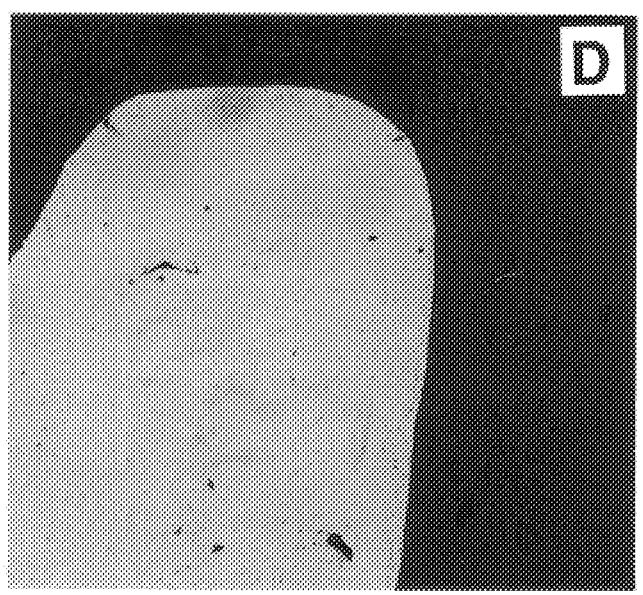

C. Adhesive stamp lithography:

As a monoparticulate film is formed by the utilization of the flow of particles, it is assumed that particles in a suspension have originally a low adsorbing property relative to a substrate. After drying, therefore, the monoparticulate film can easily be stripped off from the substrate. By using this fact, it is possible to conduct an easy mechanical lithography. A stamp bearing a picture drawn with an adhesive (prepared by affixing an adhesive tape cut along the picture onto a flat glass surface) is prepared, pressed against the monoparticulate film, and particles are stripped off by adhesion. Then, a female picture remains on the monoparticulate film surface, and a male picture, on the stamp side while keeping the texture of the particulate film. This is the adhesive stamp lithography using the monoparticulate film. A two-side adhesive tape was affixed to a glass plate and thick letters LVMH were cut therefrom. With this as a stamp, a picture LVMH was formed by removing particles onto the monoparticulate film. FIG. 9A represents a female lithograph of a 0.953 $\mu$m monoparticulate film. FIG. 9B is a male lithograph of a 1.083 82 m monoparticulate film. FIG. 9C is a male lithograph of a 0.479 $\mu$m monoparticulate film. FIG. 9D is an enlarged photograph of a character M shown in FIG. 9A, which shows clarity of the boundary of lithography.

D. Intensification of color development and fixing of monoparticulate film:

Fixing of a monoparticulate film and intensification of color development after preparation of a lithograph were found to be easily achievable by evaporation of silver or gold into a thickness of about 10 nm. This metal evaporation increases the refractive index of the particulate film and intensifies color development. Particles are covered with metal films by metal evaporation, thereby causing strong adherence with the substrate, and adhering strength is increased to an extent that the above-mentioned adhesive tape does not peel off. The adhering mechanism of particles is considered to be such that, in addition to the effect of metal film covering, direct adhesion of particles and the substrate is induced by local heating to a high temperature during evaporation.

According to the present invention, as described above in detail, a high-luminance opal-like diffraction chromogenic film free from a dead angle is achieved.

Also according to the present invention, it is possible to form a film through highly controlled advection and accumulation of a particulate monolayer film and to accomplish lithography, fixing and color development intensification.

What is claimed is:

1. A chromogenic film having a diffraction pattern similar to an opal comprising a hexagonally close-packed grating monolayer film of micron-order particulates having a diffraction pattern similar to an opal, when light is irradiated thereupon.

2. The diffraction chromogenic film as claimed in claim 1, wherein said particulates have a diameter within a range of from 0.1 to 10 $\mu$m.

3. The diffraction chromogenic film according to claim 1 wherein said monolayer film of micron order particulates is affixed to a substrate.

4. The diffraction chromogenic film according to claim 3 wherein the said substrate is glass.

* * * * *